United States Patent [19]
Lleres et al.

[11] 3,992,256
[45] Nov. 16, 1976

[54] CORE SUPPORT SYSTEM FOR A FAST REACTOR

[75] Inventors: Jean Lleres, St.-Ismier; Jean-Paul Martin, Ste Genevieve Des Bois; Maurice Perona, Varces Allieres & Risset; Robert Venot, Fontenay-aux-Roses, all of France

[73] Assignee: Commissariat a l'Energie Atomique, Paris, France

[22] Filed: Oct. 1, 1974

[21] Appl. No.: 510,990

[30] Foreign Application Priority Data
Oct. 9, 1973 France .................... 73.36035

[52] U.S. Cl. .................... 176/40; 176/38; 176/87; 176/62
[51] Int. Cl.² .................... G21C 15/00
[58] Field of Search .................... 176/40, 37, 38, 62, 176/63, 65, 87

[56] References Cited
UNITED STATES PATENTS

| | | | |
|---|---|---|---|
| 3,001,923 | 9/1961 | Tunnicliffe et al. | 176/62 |
| 3,318,776 | 5/1967 | MacPhee | 176/62 |
| 3,394,051 | 7/1968 | Purdy | 176/65 |
| 3,715,270 | 2/1973 | Jackson | 176/40 |
| 3,719,556 | 3/1973 | Snyder, Jr. et al. | 176/87 |
| 3,893,886 | 7/1975 | Aubert et al. | 176/61 |

FOREIGN PATENTS OR APPLICATIONS

| | | | |
|---|---|---|---|
| 2,036,828 | 12/1970 | France | 176/65 |
| 1,236,674 | 3/1967 | Germany | 176/65 |

Primary Examiner—Harvey E. Behrend
Attorney, Agent, or Firm—Cameron, Kerkam, Sutton, Stowell & Stowell

[57] ABSTRACT

In a sodium-cooled fast reactor comprising a reactor tank and diagrid, a core support grid carried by the reactor diagrid and a number of pipes each supplying the support grid with liquid sodium coolant through a bellows seal, the reactor diagrid is constituted by a rigid annular structure having a flat annular bearing face resting on an annular bearing face of the core support grid. High flexural rigidity of the support grid is provided by strengthening ribs, by welded through-passage columns for the fuel elements and by a raised peripheral framework mounted on the support grid for carrying the shield system.

6 Claims, 2 Drawing Figures

CORE SUPPORT SYSTEM FOR A FAST REACTOR

This invention relates to a core support system for fast reactors which are cooled by circulation of liquid sodium.

It is known that the construction of a supporting unit for a nuclear reactor core usually entails the use of a rigid diagrid fixed on the primary tank of the reactor containment structure. Said diagrid is a high-strength, mechanically welded structure having the shape of a disc and attached to the primary tank at its periphery. The reactor core is supported on said diagrid by a mechanical structure in the form of a hollow collecting cylinder or grid which is not usually expected to afford flexural rigidity; the core support grid bears on the reactor diagrid at a large number of points which are uniformly distributed over the entire surface of this latter. The essential function of the core support grid is to maintain the fuel assemblies in fixed positions determined with very high accuracy as well as to receive the pressurized sodium which is discharged by the primary pumps for distribution within the fuel clusters through columns provided for this purpose within the reactor containment structure.

The reactor diagrid is usually raised at its periphery by means of supports for false grids which are built-up around the core support grid and carry the lateral neutron-shield structures which are mounted thereon. Separation of the various pressure zones of the sodium upstream and downstream of the pumps is carried out at the level of the core support grid by means of two bellows seals of large diameter.

As will become more readily apparent from FIG. 1 which is described below and illustrates a conventional system for supporting the core of a fast reactor such as the Phenix reactor, the systems of the prior art made it difficult to demount and replace the core support grid. Furthermore, the construction of bellows seals having diameters equal to the external diameter to the support grid proves in practice to be a technically difficult operation. Moreover, the surface flatness of the reactor diagrid which carries the core support grid is impaired by deformations which arise during operation, with the result that the plane of the large number of bearing locations is transformed into an irregular surface as a result of creep deformation of the diagrid.

In the event of damage sustained by a number of fuel elements located within the reactor core, the debris fall through the diagrid and collect at the bottom of the primary tank containment where they cannot readily be recovered.

This invention is concerned with a system for supporting the core of a sodium-cooled fast reactor comprising a reactor tank, a diagrid attached to said tank, a core support grid fitted with through-passage columns for the fuel elements and carried by said reactor diagrid, a plurality of pipes for supplying the support grid with liquid sodium coolant; said system is distinguished by the fact that said reactor diagrid is constituted by a rigid annular structure provided with a flat annular bearing face and that said core support grid is also provided with an annular bearing face, said support grid being seated on said reactor diagrid by causing the annular bearing face thereof to be applied against the annular bearing face of said diagrid, and that the pipes which open into the core support grid for supplying said grid with liquid sodium coolant are each connected to a framework which is secured to the reactor diagrid by means of an expansion bellows seal.

In the system according to the invention, since the core support grid rests on the reactor diagrid only along an annular bearing face, it is necessary to endow said grid with a higher degree of flexural rigidity or bending strength than was the case in the design solutions of the prior art in which said support grid rested on the entire surface of the reactor diagrid. To this end and in accordance with a characteristic feature of the system, the invention is distinguished by the fact that the core support grid is provided with strengthening ribs located either beneath the bottom plate of said grid or beneath both the bottom and top plates thereof. By this means, the grid is endowed with a sufficient degree of flexural rigidity to make it self-supporting, with the result that it is no longer necessary to support the grid over its entire surface but only at the periphery.

In an alternative embodiment of the invention which is intended to give greater rigidity to the core support grid, the columns located within the interior of said support grid are turned to useful account by being employed both for joining the bottom plates to the top plates and as guides for the fuel element clusters. The system in accordance with this alternative embodiment of the invention is distinguished by the fact that the columns are welded to the core support grid at the top and bottom ends thereof, with the result that a rigid connection is thus formed; welding of the columns can be carried out for example by the electronic beam welding process.

The rigidity of the reactor diagrid structure is further enhanced by reason of the fact that an annular framework which constituted the false-grid support in designs of the prior art is incorporated with said diagrid structure, the lateral neutron shield system which surrounds the reactor core being intended to be mounted on said annular framework.

In this invention, the reactor diagrid is of annular design instead of being in the shape of a disc. Since the entire central portion of the diagrid no longer serves any useful purpose and is dispensed with, profitable use can therefore be made of the space which is thus freed at the center of the diagrid in order to instal a catchpot for the recovery of hot debris beneath the core support grid.

In accordance with a secondary characteristic feature of the invention, the system is distinguished by the fact that a container or so-called catchpot for collecting falling materials from the reactor is placed beneath the core support grid. Said catchpot is attached either to the core support grid or to the reactor diagrid. In a preferential embodiment of the invention, said catchpot is made up of annular L-section members in juxtaposed relation for the purpose of recovering and distributing materials and debris uniformly over the bottom of the catchpot.

A better understanding of the invention will in any case be obtained from the following description of one embodiment of the invention which is given by way of example without any limitation being implied, reference being made to the accompanying drawings, in which.

As already mentioned in the foregoing, the system in accordance with the invention offers the possibility of demounting and if necessary of replacing the core support grid much more readily than was the case in support systems of the prior art. This more convenient arrangement makes it possible to recover the support grid after a major accident involving the reactor core. This design concept improves the demountability of the support grid which is in fact secured to the stationary portions (reactor diagrid and inner tank) only by means of the pump ducting; in order to free said support grid, it is only necessary to cut the connections between the grid and the pump ducts on a section plane; in other words, the bellows seals which also serve as expansion joints no longer constitute an obstacle to disassembly. In the prior art design, the positioning of a new support grid was an operation involving considerable risk and uncertainty in regard to the final results if not actually impossible whereas this positioning operation has now become wholly practicable by means of the solution which is now proposed.

Figure 1:
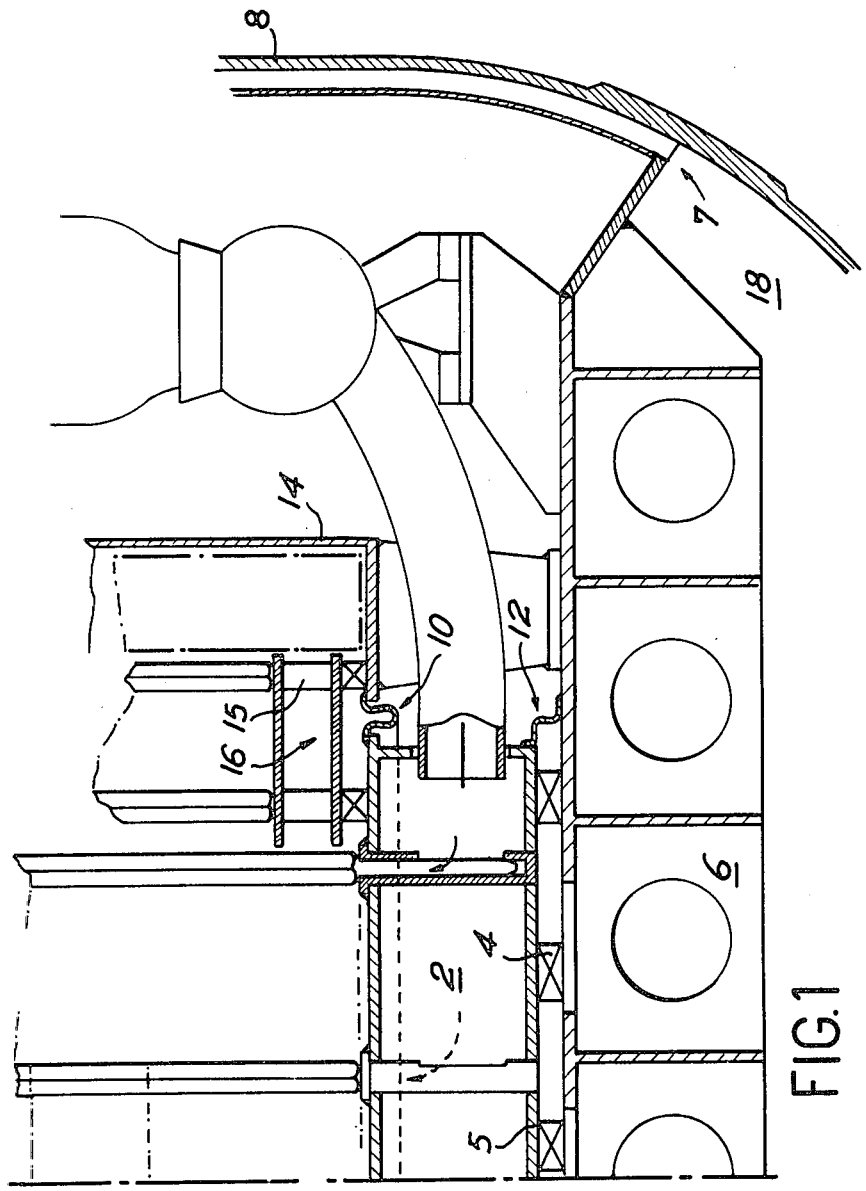
FIG. 1 is a constructional diagram of the reactor core support system of known type.

FIG. 1 shows the conventional core support system comprising a grid 2, that is to say a mechanical structure which is not intended to afford resistance to bending stress since it is applied against the reactor diagrid at a large number of points 4 uniformly distributed over the entire bottom plate 5 of the support grid. The reactor diagrid 6 is fixed at 7 on the primary tank which is designated by the reference 8. Separation of the different sodium pressure zones is achieved at the level of the core support grid by means of two bellows seals 10 and 12 of large diameter surrounding the grid on which the reactor core is supported. The diagrid is raised at the periphery of this latter by the support 14 which is provided for the false grid 15 and built-up around the core support grid. The bellows seal 10 and 12 separate the sodium which surrounds the reactor at 16 from the sodium in which the reactor diagrid is immersed at 18.

Figure 2:
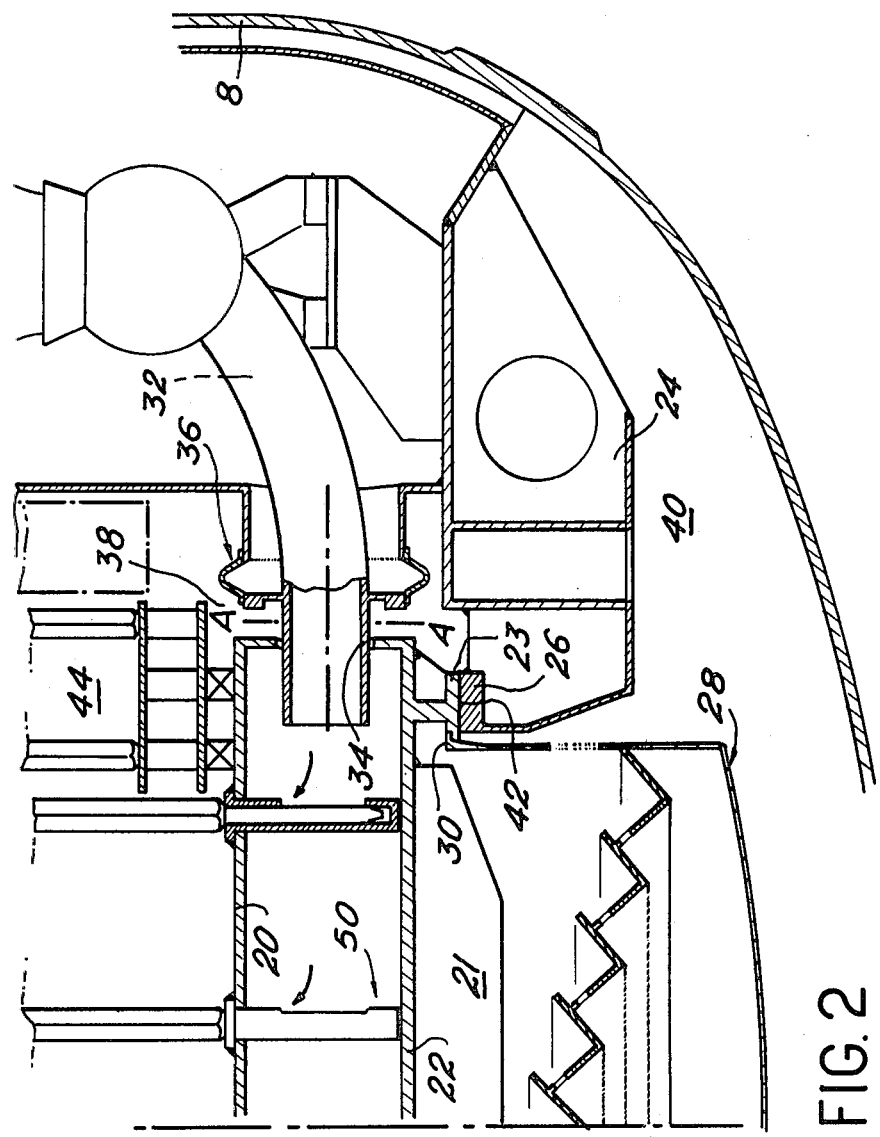
FIG. 2 is a constructional diagram of the core support system in accordance with the invention for a fast reactor which is cooled by a flow of sodium.

FIG. 2 shows one embodiment of the invention comprising a core support grid 20 which is provided with ribs such as the rib 21 on the bottom plate 22 of said grid in order to provide enhanced strength and rigidity of this latter. The grid 20 is supported by the annular bearing face 23 on the reactor diagrid 24 which is accordingly provided with an annular bearing face 26. The catchpot 28 is attached to the support grid at 30 and is rigidly fixed thereto. The pipe for the admission of liquid sodium derived from the pump 32 is connected to the support grid through the duct 34 by means of an expansion seal 36 which surrounds said pipe. The sodium at 38 is separated from the sodium at 40 by the joint which is formed as a result of application of the core support grid against the reactor diagrid and which is located at 42. The false grids located at 44 are rigidly fixed solely to the core support grid and provide this latter with enhanced rigidity. Demounting of the support grid entails the need only to cut the sodium admission pipes along the section shown at A, for example. Demounting by withdrawal of the support grid from the top of the reactor tank makes it possible to lift the catchpot which is attached thereto and thus to recover the debris which have collected within said catchpot.

By dispensing with bellows seals of large size, the two usual bellows elements of large diameter (7 meters in the case of a reactor of 1200 MW) can be replaced by four bellows seals of small diameter (1.3 meter in the case of the same reactor).

In this example of construction, only the sole-plate or bottom plate of the core support grid is stiffened by the ribs which are welded to the underface of this latter. The continuous annular bearing face 26 is disposed at the periphery of the ribbed zone and at the level of its neutral deflection surface so as to limit sliding movements of said bearing face. The catchpot is rigidly fixed to the core support grid.

Among the advantages of this preferential alternative form of construction, the following are worthy of note:

it is not necessary to weld the support columns such as the column 50 since the connections between these latter and the sole-plates 20 and 22 remain of a mechanical type; accuracy of location of said columns can therefore be obtained without general re-machining after assembly;

provision is made for a self-supporting grid unit which offers the advantages of disassembly as described earlier without losing the main advantage of the conventional grid unit which lies in the ease of construction to this latter;

the fact that the ribs are located beneath the core support grid makes the thickness and accuracy of location of said ribs less dependent on the spacing of the columns; said ribs do not interfere with the circulation of sodium through the support grid as would be the case with internal ribs. However, it should be pointed out that internal ribs located beneath the top grid plate have the effect of considerably increasing the rigidity of said grid and may prove necessary in the case of heavy reactor blocks;

the columns do not contribute to the mechanical strength of the structure and can consequently have a smaller cross-sectional area, thereby permitting lower pressure drops in the circulation of sodium as well as a reduction in the height of the core support grid;

the techniques of construction of the support grid remain very conventional, especially in regard to the welded connections which can be formed by ordinary means.

The ease of disassembly and the possibility of recovery of debris within a specially designed catchpot in the event of accident are considerable advantages in the case of liquid sodium reactor which is operated under blind control conditions over long periods of time.

What we claim is:

1. In a fast reactor cooled by circulation of liquid sodium and comprising a reactor tank, a diagrid attached to said tank, a hollow cylindrical collector core support grid mounted on said diagrid, spaced parallel bottom and top plates forming said support grid, through-passage columns in said plates for the fuel elements, a plurality of pumps mounted on said diagrid supplying said support grid with liquid sodium coolant, said reactor diagrid including a rigid annular structure, a flat annular bearing face for said structure, an annular bearing surface for said core support grid, means for providing rigidity against flexing of said support grid, said support grid seating on said reactor diagrid by engagement of said annular bearing face on said annular bearing surface, pipes connected to said pumps opening horizontally into said core support grid for supplying said grid with liquid sodium coolant, a framework secured to said reactor diagrid supporting said pipes and a vertically disposed expansion bellows seal connecting each of said pipes to said framework.

2. A reactor according to claim 1, including ribs beneath said bottom grid plate to increase the strength and rigidity of said grid.

3. A reactor according to claim 1, including means for securing said columns to said core support grid plates at the bottom and top end of said columns to increase the rigidity of said grid.

4. A reactor according to claim 1, including a catchpot for collecting materials dropped from the reactor core mounted on and beneath said core support grid.

5. A reactor according to claim 4, said catchpot being rigidly fixed to said core support grid.

6. A reactor according to claim 5, said catchpot including annular L-section members in juxtaposed relation distributing materials and debris uniformly in said catchpot.

* * * * *